United States Patent [19]

Moeglich

[11] 4,048,028
[45] Sept. 13, 1977

[54] SORBENT PARTICULATE MATERIAL AND MANUFACTURE THEREOF

[75] Inventor: Karl Moeglich, Williamsville, N.Y.

[73] Assignee: Clearwater Systems Inc., Williamsville, N.Y.

[21] Appl. No.: 698,293

[22] Filed: June 22, 1976

[51] Int. Cl.² .............................................. C25B 1/20
[52] U.S. Cl. ........................................ 204/97; 204/96
[58] Field of Search .................................. 204/96, 97

[56] References Cited
U.S. PATENT DOCUMENTS

| 3,489,664 | 1/1970 | Popat et al. | 204/96 |
| 3,869,359 | 3/1975 | Beer | 204/96 |

Primary Examiner—R. L. Andrews
Attorney, Agent, or Firm—Raymond F. Kramer

[57] ABSTRACT

A sorbent particulate material, such as a metal hydroxide-coated sawdust, is made by passing a direct electric current between an anode of a metal capable of forming a flocculent hydroxide and a cathode in a turbulent electrolyte containing the dispersed particulate material, so as to form a metal hydroxide and deposit it on such material. Also described are filters made from the sorbent particulate material and processes of filtering or otherwise removing undesired components from liquid media by means of such product.

12 Claims, 5 Drawing Figures

SORBENT PARTICULATE MATERIAL AND MANUFACTURE THEREOF

This invention relates to a process for the manufacture of sorbent particulate materials. More particularly, it relates to an electrolytic method whereby a suitable metal hydroxide is produced and deposited on a particulate material to increase the effectiveness of such material as a filtering and/or purifying medium. The invention is also of the material produced and is relevant to filters made from such material or incorporating it and to methods of utilizing it to filter or otherwise remove constituents from liquid media, usually aqueous media.

Metal hydroxides, such as those of divalent and trivalent metals, e.g., aluminum hydroxide, iron hydroxide, are known to form gelatinous hydrates which are useful as sorptive flocculents, capable of adsorbing on the surfaces thereof and entrapping in their interstices various colloidal particles, such as clays, calcium carbonates and other inorganic and organic dispersoids. Such materials are also useful to sorb color bodies and in many instances even remove other soluble impurities from liquid media, such as from aqueous solutions. However, when used as filter beds the gelatinous metal hydroxides tend to prevent permeation, percolation or passage of liquid medium or aqueous solvent through them, thereby diminishing their utilities as filter media. Accordingly, there is a need for the production of useful filter media including gelatinous metal hydroxides but not having the undesirable excessively conglutinating or flow-limiting properties thereof.

In U.S. Pat. No. 2,361,092 a filter is provided which is useful to remove sludge from lubricating oils and which comprises a relatively loose-bodied mass of fibrous material, such as cuttings of corduroyed cellulose wadding and cotton waste, compacted into a unitary body after being impregnated with a porous adsorbent mineral gel, which may be an aluminum hydroxide gel. U.S. Pat. No. 2,346,909 teaches the treatment of coffee grounds or particles with an aluminum compound in the presence of an alkali metal hydroxide, such as sodium hydroxide, to produce on the coffee particles a water softening compound in granular condition that is easy to handle and which permits a rapid flow of water through a bed of such particles. Aluminum hydroxide has been produced electrolytically and U.S. Pat. No. 3,415,726 is typical of many patents on apparatuses and methods for such manufacture wherein the coating of an electrode with the metal hydroxide is inhibited. U.S. Pat. No. 3,633,413 describes sacrificial electrodes of iron or aluminum being employed in the treatment of sewage to produce metal hydroxides which induce flocculation and removal of suspended materials from the sewage. The electrodes utilized are maintained clear of the metal hydroxides produced by bubbling air or other gas over them during the electrolytic process. U.S. Pat. No. 3,715,290 teaches the manufacture of a coagulating agent for use in water treatment by electrolysis of an aqueous solution of a strongly electrolytic salt and a strong acid between electrodes, at least one of which is an aluminum alloy.

Although the prior art mentioned indicates that it is known to manufacture aluminum hydroxide electrolytically and to utilize aluminum flocculents in conjunction with particulate carriers it does not teach or suggest the present invention, which relates primarily to an electrolytic method for the manufacture of an improved sorbent particulate material. The product made is an effective filter medium which entraps finely divided and colloidal particles and even removes soluble impurities from liquid (preferably aqueous) media, while still not diminishing flow of the liquid to an objectionable extent. The method is readily practiced, economical and efficient and produces an effective filtering medium which is easy to handle and is especially useful in also removing from solution color bodies, such as organic dyes.

In accordance with the present invention a process for the manufacture of a sorbent particulate material, substantially all of which usually is of a mean particle diameter of about 0.1 to 10 mm., comprises passing an electric current between an anode of a metal capable of forming a flocculent hydroxide, which is selected from those of Groups IIA, VIB, VIIB, VIII, IB, IIB, IIIA, IVA and VA and alloys thereof, and a cathode in a turbulent electrolyte containing dispersed particulate material of the given size, to form a metal hydroxide and deposit it on the dispersed particulate material. In a preferred process the turbulent electrolyte contains a conductive salt such as alkali metal chloride or sulfate, the voltage impressed between the electrodes is from about 3 to 90 volts, the particular material circulated in the electrolyte is sawdust and the cathode metal is aluminum. Also within the invention are the products made and relevant to the invention are filters or filter beds made from such products and methods of filtering liquid media and removing soluble or colloidally dispersed materials from liquids by contacting such liquids with the sorbent particulate materials made.

Various aspects of the invention will be readily understood and appreciated from reference to the accompanying description of embodiments of the invention, taken together with the drawing, in which.

Figure 1:
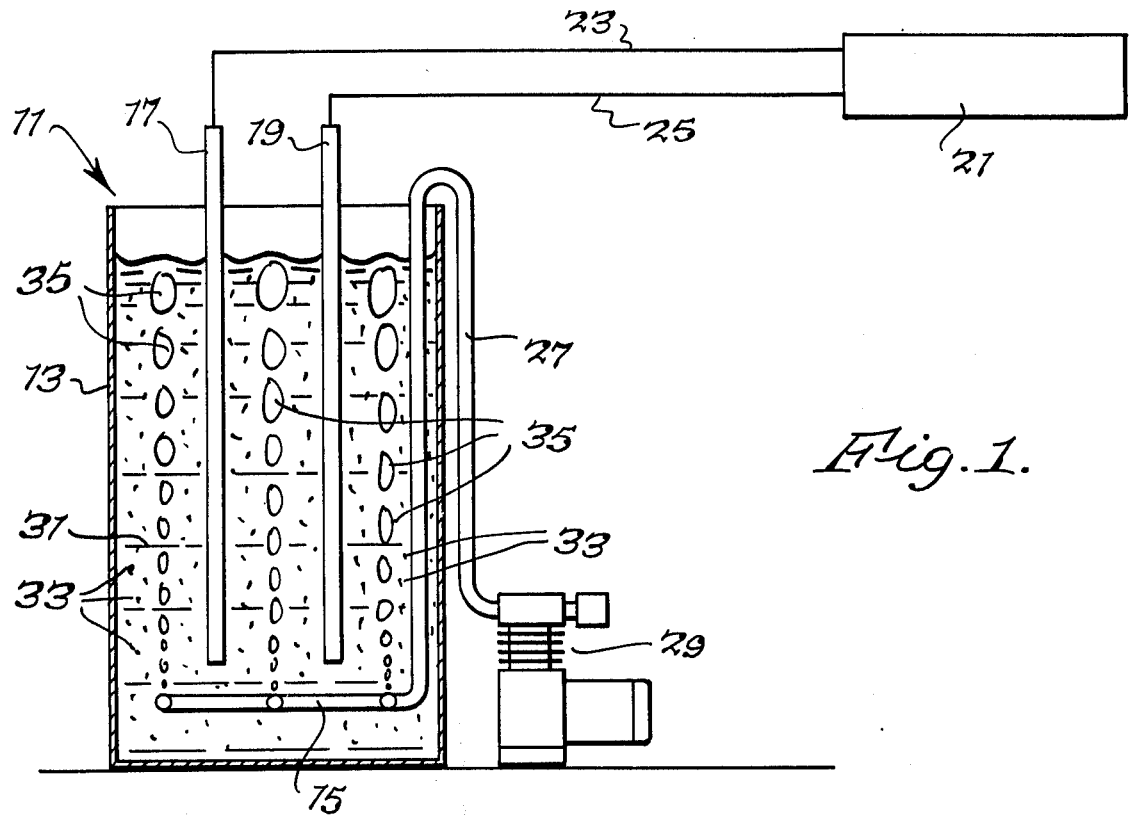
FIG. 1 is an essentially schematic central sectional elevational view of a batch apparatus for electrolytically producing sorbent particulate material by a process of this invention.

In FIG. 1 cell 11 includes container 13, air sparger or manifold 15 and electrodes 17 and 19. Power supply 21 is connected to the electrodes via conductive lines 23 and 25 and the sparger is communicated via air line 27 to air compressor 29. Inside electrolytic cell 11 is electrolyte 31, containing dispersed particles 33 of base material onto which is being deposited a metal hydroxide coating being produced in the cell. Air bubbles 35, released from the air manifold or sparger 15, maintain turbulence of the electrolyte 31 during the electrolysis and coating operation. Although it is highly preferred for one of the electrodes to be a DC anode, e.g., electrode 17, and the other to be a cathode, in some aspects of the invention desirable hydroxide production is effected by utilization of alternating current of characteristics, such as voltage and current density, like those of the direct current normally and preferably employed.

Figure 2:
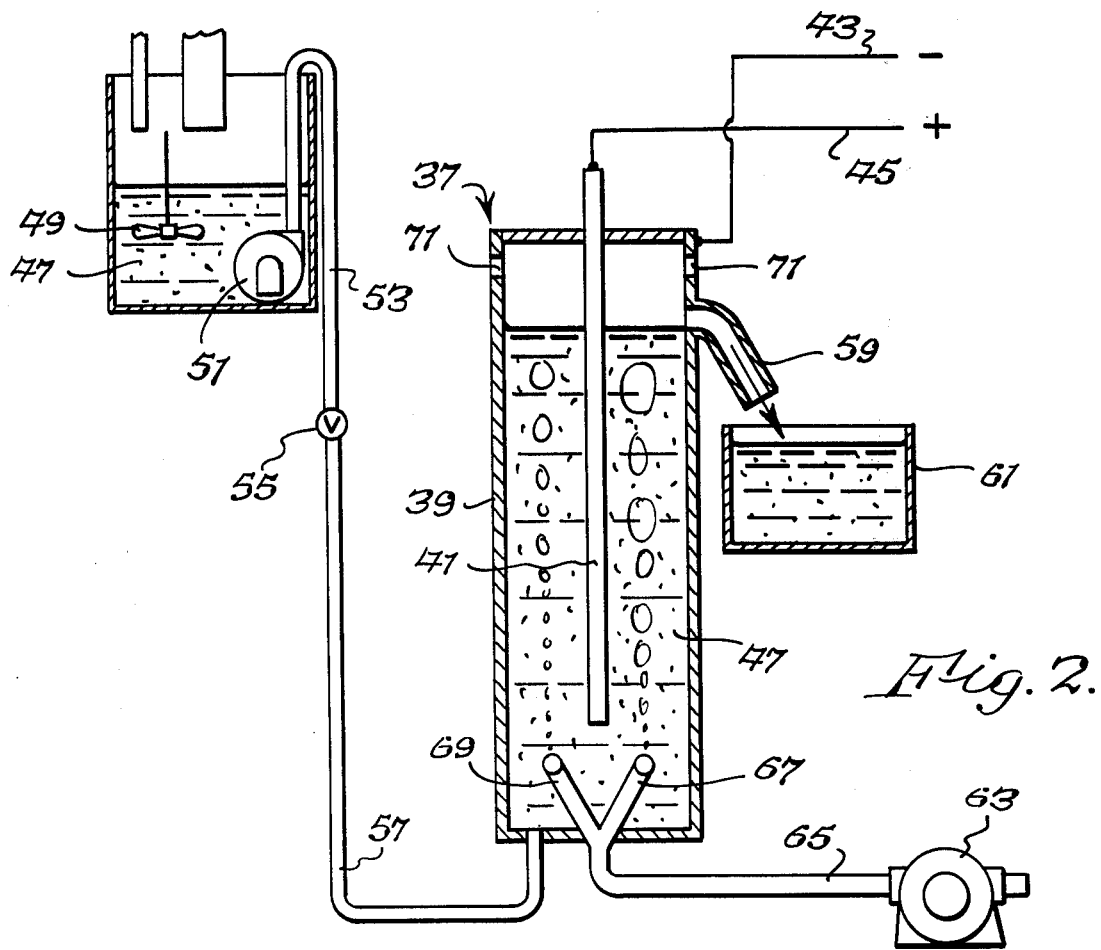
FIG. 2 is an essentially schematic central sectional elevational view of an apparatus for effecting a continuous process of this invention.

The apparatus of FIG. 2, useful in continuous processes for manufacturing the present coated sorbent particles, includes a vertical tubular cell 37 having a metal wall cathode 39 and an internal rod anode 41 connected to negative and positive sources of electricity, respectively, by lines 43 and 45. A slurry 47 of particulate carrier material, such as sawdust, water and electrolyte, is kept uniform by movement of stirrer 49 and is pumped by pump 51 through line 53, valve 55 and line 57 into the bottom of cell 37, from which it moves upwardly and out exit passageway 59 to holding tank 61 (after having been sufficiently coated with hydrated metal hydroxide). Control of the speed of movement upwardly of the electrolyte containing dispersed particulate material (and metal hydroxide coating thereon) through the electrolytic cell is effected by control of the speed of pump 51 and the opening of valve 55. During operation of the cell air compressor 63 delivers air through lines 65, 67 and 69 to the bottom of the cell to maintain desired agitation and resulting turbulence therein. The air escapes through vents 71 in cathode wall 39.

Figure 3:
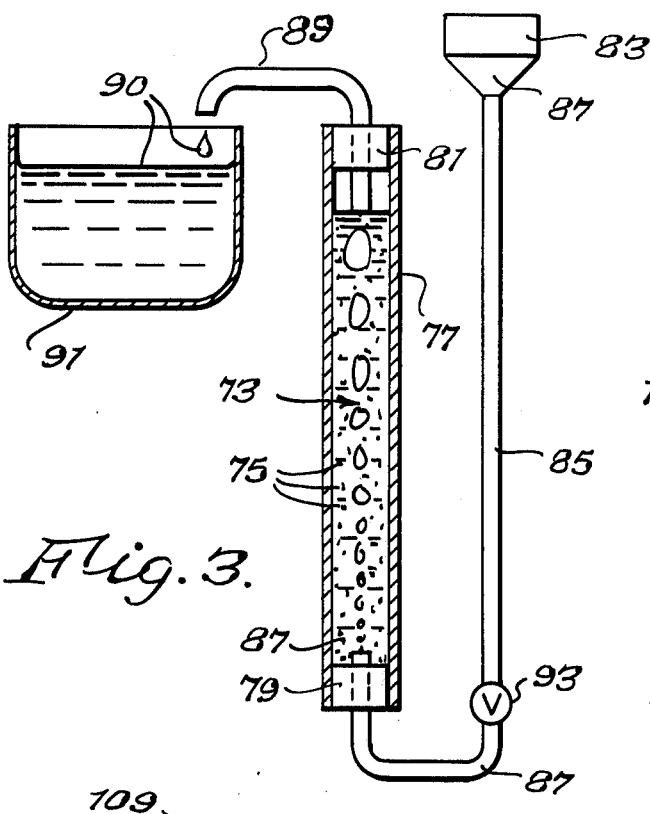
FIG. 3 is a central sectional elevational view of a laboratory apparatus for testing the filtering and sorbent effectiveness of a product of a process of this invention.

FIG. 3 illustrates a filter bed 73 comprising sorbent metal hydroxide-coated particles 75 packed in tube 77, which is closed at its lower end by stopper 79 and at its upper end by stopper 81. Through the packed bed, from supply vessel 83 through delivery line 85, which passes through stopper 79, is flowed liquid 87 containing either particulate or dissolved materials to be removed from it by the sorbent particles. The purified liquid 90 passes out line 89 into receiver 91, the flow driving force being that of gravity and being controllable by a valve 93.

Figure 4:
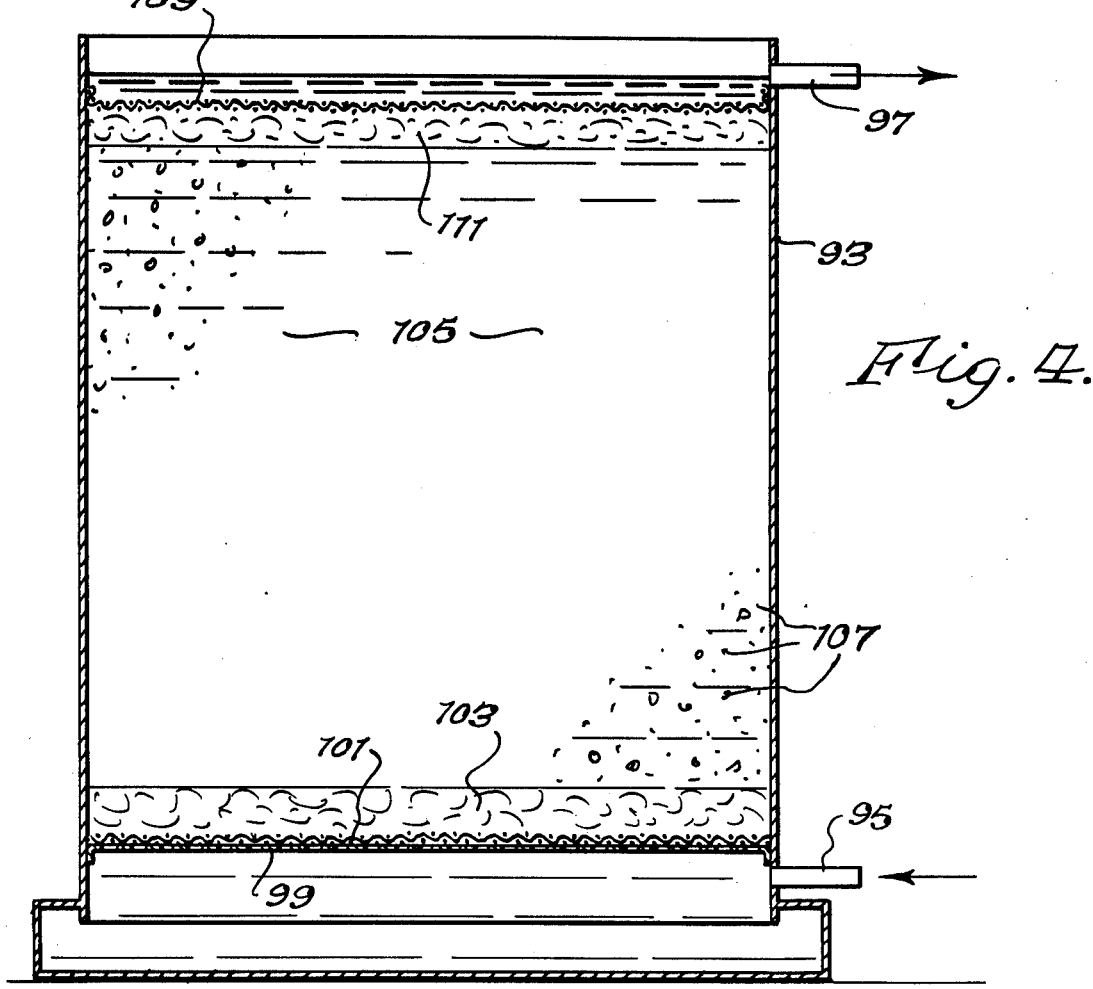
FIG. 4 is a central sectional elevational view of another apparatus for testing and effecting filtration and sorption by particles made in accordance with this invention.

In FIG. 4 a more commercial version of the purification means of FIG. 3 is illustrated. Container 93, having an inlet 95 and an outlet 97 near the bottom and top thereof, respectively, has a perforated support 99 across the bottom thereof, on top which is a screen 101 and filter floss, glass wool or other suitable supporting material 103. Bed 105 of treated particulate sorbent material 107 fills container 93 to near the top thereof and on top of it is placed a screen cover 109 to hold the bed in place, with filter floss 111 intervening between it and the packing particles for the cell. Auxiliary equipment such as means for feeding liquid to be treated and for collecting the purified liquid is not illustrated but may be conventional, like the corresponding items of FIG. 3.

Figure 5:
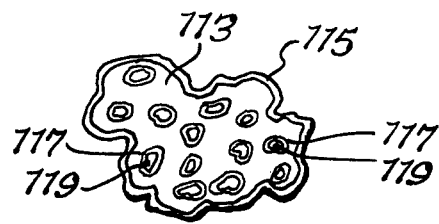
FIG. 5 is an enlarged sectional view of a sorbent particle made by the method of this invention.

In FIG. 5 a single particle of sorbent material is shown, including a base supporting material 113, e.g., a particle of sawdust, coated by metal hydroxide coating 115, strongly adherent thereto. Passageways 117 through the porous base particle are shown and these are interiorly coated with deposits 119 of metal hydroxide, applied by the mechanism of the invented process. In use, to remove finely divided solids or to sorb soluble materials, such as color bodies, the metal hydroxide is more effective than the base material and most of the sorbed or entrapped impurity or impurities being removed by use of a bed of such particles as a filter medium or sorbent bed are held to the metal hydroxide portions thereof.

The base material utilized, on which the metal hydroxide coating is deposited, is normally a particulate material available naturally or obtained by size reduction and/or screening of unitary materials or substances of larger particle sizes. For most efficient depositing of metal hydroxide coating on the base material it is preferred that a porous base should be employed. Such a base is one which, if cut by a plane passing through the material or particle at a distance 5% of the diameter from the mean surface of the particle, will have cut and exposed voids or passageways, macroscopic, microscopic or capillary, which will be at least 5% (preferably at least 10%) of the "surface" cut by the plane. However, non-porous base particles or granules may also be employed, especially if the particle sizes thereof are decreased further or the shapes thereof are such as to result in an increase in effective surface area. The preferred porosity will usually be between 0 and about 95% (a maximum of 95% of voids cut by any cutting plane through the particle) and preferably will be from about 10 to about 75%.

Although porous particulate materials are preferred, the carrier material can be any solid and may be of insulating, semi-conductive or conductive materials or mixtures thereof. For example, sand, metal powder and ground or shredded synthetic organic polymeric plastics or natural polymers, e.g., phenol formaldehyde resins, acrylonitrile-butadiene-styrene resins, polymethyl methacrylates and hard rubbers may be used. When metal powders are employed the surfaces thereof are preferably oxidized, usually by thermal means or processes, prior to treatment by the method of this invention.

Although the base particles will normally be those wherein the dimensions along the usual three axes thereof will be approximately the same, usually no axial dimensions being more than 5 times the average of the other 2 and preferably with no such dimension being more than 3 times that of either of the other two, and while the particles will normally be considered essentially spherical in shape, for purpose of calculations of effective volumes and surfaces, it is within the invention to utilize cloth scraps, sheet fragments, pre-molded packings of desired shapes, e.g., short cylinders or saddles, rods and filaments. The particle sizes of the base materials will normally be between 0.1 mm. and 1 cm., preferably being from 0.1 to 5 mm. and more preferably being between 1 mm. and 5 mm. in diameter (mean or effective diameter).

The most preferred base particle material found so far is sawdust, preferably a softwood sawdust such as pine, fir, spruce or balsam sawdusts, but such dusts or ground woods obtained from the usual hard woods, e.g., oak, hickory, maple, cherry, may also be employed. Also useful are particles of synthetic organic polymers, such as those previously described, and shredded polymers, cotton wastes, linen fragments and other textiles. Usually it will be desirable to minimize costs of the present products by employing waste materials, such as sawdusts or cotton wastes, which would otherwise be of little value.

The metal hydroxides deposited on the base particles are most preferably those which are fluocculent in nature, usually being of a metal of one of groups IIA, VIB, VIIB, VIII, IB, IIB, IIIA, IVA and VA. Alloys, e.g., stainles steel, magnesium alloys, may also be employed as sources of the metals of hydroxides thereof, which are normally hydrated during the invented process, to convert them to gelatinous, glutinous or flocculent form. Usually the metals that are most effective will have a valence of two or three and of these the most preferred are aluminum, iron and magnesium but nickel, copper, cadmium and manganese are also considered to be very useful. Mixed metals may be employed as materials of a single anode or different metals may be used in a plurality of anodes so as to produce mixed metal hydroxides on the carrier particles and give them more universal impurity filtering and sorbing properties. The hydroxides of the more positively charged metals, such as magnesium hydroxide, barium hydroxide and strontium hydroxide, for example, may be desirably employed to remove a particular type of impurity from a solution to be treated by the products of this invention whereas other hydroxides, such as those of nickel, copper, cadmium, iron, aluminum or manganese, which are more amphoteric or negative in nature, may be used in the treatment of liquids containing other impurities, against which they are specifically more effective. Alternatively, mixtures thereof may be employed as more universal treating compositions or sequential treatments may be effected.

In accordance with the present invention more desirable and effective flocculent or gelatinous and normally hydrated hydroxides are made by electrolysis and the source of the particular metal of the hydroxide is the anode. The anode may be of any suitable shape, with strip, sheet, rod or tube anodes usually being preferred. The anodes may face the cathodes, may be surrounded by the cathodes or may surround the cathodes. Preferably the anodes will be smooth surfaced so as to facilitate maintenance of such surface free of undesirable hydroxide accumulation during electrolysis. The cathodes can be made of any of the mentioned shapes and materials or alloys but are preferably carbonaceous and most preferably are of graphite.

During the electrolysis the base particles are maintained in constant movement in liquid electrolyte so that they may become evenly coated with metal hydroxide produced by the reaction of hydroxyl ions and metal ions released at the anode. The liquid medium is preferably an aqueous medium and contains a conductive material to produce an electrolyte capable of satisfactorily conducting electricity and promoting the electrolytic process by which the metal hydroxide is produced. The most preferred strongly conductive salts are the alkali metal halides, preferably the chlorides, e.g., sodium chloride, potassium chloride, but sulfates and other suitable salts may also be employed, usually also of the alkali metals. The concentrations thereof in the electrolyte may be from 25 to 500,000 parts per million but for sodium chloride, which is not as soluble as many other salts, the upper limit may be about 300,000 parts per million, by weight. Preferably the salt concentration is between 0.2% and 5% and most preferably between about 1 and 2%.

Voltages, current densities, times of current applications, degrees of turbulence, electrode shapes and dispositions and temperatures of electrolysis will be chosen to obtain the desired extent of metal hydroxide coating on the substrates utilized so as to best suit them for particular filtering and purification applications. Normally, however, the turbulence will be maintained at above the critical Reynolds number for the container shape so that essentially all of the electrolyte and contained substrate particles will be in constant turbulent motion. For cylindrical pipe shapes the critical Reynolds number is between 2,000 and 3,000, e.g., 2,300. This may be maintained by pumping action, sparging with air or other gas or by agitation, as by mechanical, magnetic or vibratory agitators. The temperature of the electrolyte will usually be between 5° and 95° C. but higher and lower temperatures may be employed so long as the medium remains liquid and satisfactory production and deposition of the metal hydroxide results. Normal operating temperatures will be in the range of 15° to 40° C., to minimize objectionable agglomeration and resultant loss of active gelatinous metal hydroxide surface area.

The voltage impressed between the electrodes will usually be in the range of 3 to 90 volts, preferably 5 to 40 volts and more preferably about 5 to 15 volts. Low current densities are useful in some applications so the range thereof may be from as little as 0.1 microampere per square centimeter to as much as 5 amp./sq. cm. Normally this will be from 0.01 to 0.5 amp./sq. cm. and especially preferred is the range of 0.05 to 0.1 amp./sq. cm. The electrolysis time, for either the batch or continuous process, will usually be from 1 minute to 1 hour and preferably is from 5 to 30 minutes, e.g., 20 minutes. Electrolysis time for the continuous process may be regulated by modification of the throughput flow rate. Current flow will usually be in the range of 0.1 to 100 amperes and normally is from 1 to 40 amperes, e.g., 5 to 25 amperes.

The thickness of metal hydroxide on the substrate particles may be controllable so as to be from as little as a monomolecular film to as much as 20% of the thickness of the substrate, preferably being from 0.5 to 10%. Usually the thickness will be from 0.001 to 1 mm., preferably being from 0.01 to 0.1 mm. However, an equivalent of metal hydroxide thickness in determining the nature of the coated sorbent particles made is weight of metal hydroxide (not including water of hydration) per unit weight of coated particle. Such weight will normally be from about 0.001 to 5% of the metal hydroxide in the final sorbent particulate material produced, on a dry basis (omitting water of hydration and water present with the sorbent), preferably 0.005 to 1% and more preferably about 0.1 to 1%. Another way to measure the amount of hydroxide present, and perhaps a more practical way because it does not require dehydration or analysis of the product but allows control of the process to determine the type of product made, is application of the desired current flow for the desired time to the electrolyte containing a known mass of particles. Thus, when from 0.5 to 200 coulombs per gram of particulate materials, preferably 1 to 100 or 5 to 50 coulombs per gram, are charged to the anode, solubilizing a portion thereof, a useful proportion of metal hydroxide will be produced and will be deposited on the particulate substrate particles. Of course, if alternating current is employed such coulomb measurement will not be directly applicable.

The concentration of substrate particles in the electrolyte may be varied over a wide range, with the limits being determined by the efficiency of the process and the capability of producing turbulent flow. Thus, a minimum proportion of particles is needed to allow an efficient combined electrolysis and coating operation to be effected and the upper limit on the particle concentration is that at which turbulent flow can still be economically maintained by agitating, stirring, sparging or other practical method. Usually the weight ratio of particles to electrolyte will be from 1 to 20%, preferably 5 to 20%.

In carrying out the electrolytic process of this invention for manufacturing sorbent particles, as by means of the apparatus of FIG. 1, the desired "concentration" of particles in electrolyte containing the desired proportion of alkali metal salt of a strong acid, e.g., sodium chloride, at a suitable operating temperature is maintained in turbulent flow, at a Reynolds number above the critical, by operation of an air compressor which forces bubbles of air through the electrolytic cell. The pressure of the air will usually be at least 5 cm. of water and may be as high as 10 meters of water or more, at the sparger or air manifold outlet orifices (such pressure being the excess over the head of electrolyte above such orifices). With the desired anode and cathode in place the electrolyte apparatus is connected to a suitable current source (usually DC) and electrolysis commences. During the electrolysis metal ions released from the anode react with hydroxyl ions generated in the electrolyte to form suitable flocculent or gelatinous metal hydroxides, which become hydrated and adhere to or become entrapped in the circulating substrate particles. Because the metal ions are released at the surfaces of the anode or anodes they would tend to coat such surfaces if it were not for the turbulence of the electrolyte and the contacting of the anode by the moving particles. Thus, the metal hydroxide formed in the electrolyte adheres to the moving particles and as such particles strike the anode, the cathode, the cell walls and each other, the hydroxide is forced into better contact with the particle to which it has adhered and joinder to such particle is strengthened. Furthermore, the particle may pick up additional metal hydroxide from the anode. Thus, the anode remains clean and more efficient than it would be if it were coated with metal hydroxide, and the coating of the moving particles is improved. Furthermore, because of the constant movements of the particles any flocculent metal hydroxide that may have fallen to the bottom of the cell (if the turbulence at the bottom of the cell, especially in the corners, is not great enough to circulate the hydroxide), is contacted by the substrate particles and removed therefrom.

Essentially the same reaction takes place when a plurality of anodes of different materials is employed, all being joined to the same or different sources of positive electricity. If desired, sequential coating operations may be carried out by removing partially coated particles from the cell and adding them to another similar cell, which may operate under different electrolytic conditions and possibly with a different anode material. Of course, a plurality of multiplicity of such sequential or combined coating operations may be utilized. Different substrates or mixtures thereof may also be utilized but usually only a single substrate will be employed and of the substrate materials sawdust is much preferred.

Modification of the batch process to make it continuous, utilizing an apparatus like that of FIG. 2, is self-evident from the description of the apparatuses and the methods previously given. Sequential continuous coating operations may be utilized and different electrodes may be employed. However, normally only a single hydroxide will be used as the coating material.

After the manufacture of the sorbent particulate material it is desirably maintained in moist condition and is not allowed to dry out before use. It has been found that although the moist particles are free flowing and may easily be converted to a filter, filter bed, sorption bed or utilized in a sorption (usually adsorption) process, whether maintained wet or moist or dried, both filtration and sorption activities are better if drying or dehydration is avoided. Apparently this relates to difficulty in rehydrating dehydrated metal hydroxide hydrates. Although keeping the surfaces of the particles from drying is conducive to their being effective filtering and sorption materials it is preferred that the particles be maintained immersed in liquid electrolyte or other aqueous media so as to be covered by the liquid, with the container in which the liquid-particle mix is present being sealed to prevent access to the air.

Instead of making the sorbent particles by electrolytic means they may also be made by utilizing the same apparatus as previously described except for the elimination of electrolytic means of producing the metal ions. Thus, aluminum sulfate, aluminum chloride, magnesium sulfate, ferric sulfate, ferric chloride, manganese sulfate, copper chloride, nickel sulfate and cadmium chloride may be employed as sources of the metal ions, as may be similar soluble salts of other suitable metals. These salts, in desired amounts to result in effective metal hydroxide coatings on the substrate particles, are preferably gradually added, most preferably regularly over a period of time similar to that employed for electrolysis, usually being for ½ or 2 to 5 times such time, to the aqueous medium containing substrate particles in turbulent motion, while the source of hydroxide ions, e.g., sodium hydroxide solution, is separately added. Following such procedure, the metal hydroxide is gradually produced and hydrated to a gelatinous form, which then adheres to the individual particles. Of course, sodium hydroxide or other suitable hydroxide may also be gradually added to the electrolyte during the electrolytic process to supplement that produced electrolytically. If desired, the "chemical" or chemical-electrochemical processes may be carried out continuously, as well as by batch operations. Although the "chemical" process of making metal hydroxide-coated particles results in a useful product, such product is not as effective a filtering means or adsorption means as is the "electrolytic" product, especially when such latter product is not dried or dehydrated before use.

The sorbent particles may be formed into a filter bed or adsorption bed or may be deposited on thin filters of other materials or enclosed in cartridges to be employed as filter or sorption elements. While it is usually important to maintain the particles moist before use, to employ the invented filters or sorbents no other changes in normal filtering or sorption procedures are necessary. The material to be filtered or from which colloidal particles or chemical components are to be removed, which is usually largely aqueous, i.e., normally containing less than 0.1% of removable component, is passed through the bed, filter or sorbent and the treated effluent, minus removed particles or chemicals, is collected. Such effluent will usually be significantly purer than effluents from comparable treatments with the substrate particles alone or with the metal hydroxide alone, since the pure hydroxide often is so resistant to fluid passage that the pressure needed to force such a passage causes tears in the bed, allowing impure product, almost as charged, to pass through. Yet, the sorptive particles of this invention and the filters and beds made from them allow much more ready throughput of liquid, with pressure drops being significantly lower than with pure metal hydroxide hydrate, often being from 0.01 to 1% thereof. Thus, more effective filtration and chemical removal are obtainable. If desired, instead of forming them into a bed, coating them on a support or incorporating them in a filter type of element, the treated particles may be merely dispersed in a solution of chemical to be removed so that the individual particles can adsorb such chemical. However, in commercial processes this is usually not as efficient as is their utilization in beds or cartridge type elements or on other filter supports.

The various materials that may be satisfactorily filtered and otherwise treated with the present products are practically limitless. They include coke oven effluents, from which phenol is removable (and chemical oxygen demand is reduced significantly); black pigments suspended in water, from which almost all pigment is removed; sulfide-containing and iron-containing well waters, from which most of the iron is removed; paper mill white waters containing organic dyes, from which particular dyes are removable (although sometimes additional lighter and different colors may be picked up from the substrate); coffee and other dye solutions, from which color is largely removed; and ammonia water, from which ammonia is removed and in which the pH is lowered to neutral. Additionally, colloidally suspended particles and macro-sized particles, often of particle size less than 200 mesh, U.S. Standard Sieve Series, are removable, as from muddy or clayey waters, foundry wastes, paper mill effluents, wash waters and water treatment streams (from the last of which carbonate sludge and colloidally suspended carbonates and other minerals are readily removable). The filter particles, beds and cartridges are also useful in waste filtration systems, one of which uses is in aquarium filters, preferably in conjunction with activated charcoal.

The following examples are given to illustrate but not limit the invention. Unless otherwise indicated, all parts are by weight and all temperatures are in ° C.

EXAMPLE 1

Utilizing the apparatus illustrated in FIG. 1, with a 40 liter barrel serving as the cell container, an aluminum anode (aluminum 1134) and a graphite cathode, with effective electrode areas of about 250 sq. cm. each, are positioned as illustrated, about 5 cm. apart, and 15 liters of water at room temperature (24° C.), containing 200 grams of sodium chloride and 1.6 kilograms of pine sawdust, having an average particle size or equivalent diameter of about 1 mm., are added to the cell. After wetting of the sawdust turbulence is created in the cell by introduction of air through the illustrated sparger at a pressure of about 50 cm. of water greater than that of the head of electrolyte, so that the Reynolds number is greater than 3,000 and all of the liquid and suspended particles in the cell is maintained turbulent. A direct current potential of 8 volts is impressed across the electrodes, generating a current flow of 20 amperes and electrolysis is continued for 20 minutes. The aluminum consumed during this period is 2.04 grams, which is converted to aluminum hydroxide, in hydrated form, which deposits on and in the sawdust substrate particles to produce the desired activated sawdust product. Electrical energy consumption is 64 watt-hours and current efficiency for the production of the aluminum ions is about 91%.

In a "comparative" experiment the same apparatus is employed and the same conditions are utilized except for the omission of the electrodes and the application of electricity, with the addition of aluminum sulfate containing 2.04 grams of aluminum [14.8 g. of $Al_2(SO_4)_3$] and sufficient sodium hydroxide to react with the aluminum (1.6 g. NaOH). Additions of the aluminum sulfate and sodium hydroxide, as comparatively dilute aqueous solutions at concentrations of about 1%, are gradually and regularly made over a period of about 55 minutes and about 5 minutes later the procedure is halted and the coated sorbent particles are recovered. The time required for the described "chemical" production of the sorbent particles is longer than that for the "electrolytic" method and the product made is not as effective a sorbent or filtering means, whether used in dispersed particulate form, deposited on a supporting filter surface, in a filter bed or in a filter cartridge, The "electrolytic" and the "chemical" products are both more effective in both filtering and chemical sorption properties when they are maintained wet during the entire time after manufacture and before use.

The same procedure is followed in a continuous electrolytic process, in which the apparatus employed is that of FIG. 2, with the aluminum anode being a rod located in the center of a cylindrical tubular cell of graphite and with the flow of carrier, water and salt being regulated so as to produce the desired coated product at the same rate as in the previous electrolytic example. In a related modification the anode is removed, no electricity is employed and aluminum sulfate and sodium hydroxide are separately charged to the "reaction cell" and removed therefrom over the 1 hour period previously employed in the batch "chemical" process. The products resulting have properties like those from the respective batch processes, with the electrolytic product being superior in sorption and filtering action to that of the chemical process.

In various modifications of the described experiments anode materials are changed and metals of Groups IIA, VIB, VIIB, VIII, IB, IIB, IIIA, IVA and VA are used, together with alloys of such metals, e.g., magnesium, iron, steel, manganese, nickel, copper and cadmium, the operating temperatures times, voltages, current densities and coulomb transfers are varied within the ranges given in the specification, such variations being ±10%, ±25%, ±50% of the figures previously given for the electrolytic processes, and satisfactory coated sorbent particles are made. The described experiments are further modified to utilize sand, chopped linen, chopped cotton, oxide-coated iron particles, phenol formaldehyde powder and hard rubber powder substrates, of the same particle sizes, and useful sorbent particles are made with the metal hydroxides, e.g., aluminum hydroxide, magnesium hydroxide, coated on the surfaces thereof. Similar results are also obtained when particle sizes of the bases are varied within the limits previously mentioned. Similar products made by the chemical methods, whether batch or continuous are not as satisfactory, as a rule, as the electrolytic products.

In further modifications of the manufacturing processes described a pair of anodes is employed, one being of aluminum and the other being of magnesium, so that the resulting metal hydroxide coating on the substrate is a mixture of hydrated hydroxides, one of which, the aluminum hydroxide is more amphoteric, and the other of which, the magnesium hydroxide, is more positive, so as to make the activated particles more effective against a variety of chemical impurities to be sorbed. Similarly, sequential processes in which aluminum hydroxide is first deposited, followed by magnesium hydroxide, are utilized and the products made are satisfactory sorbents and filter components. Such experiments are repeated with the other metals previously mentioned, the various combinations thereof and the different substrates, with essentially the same types of results.

In all the above electrolytic experiments the resulting products that are preferred are those wherein the substrate is of a porosity in the 5 to 95% range, preferably 10 to 75%, as is the pine sawdust described. Invented products based on other sawdusts, such as those previously mentioned, and similar porous products, such as chopped linen and cotton, are also of about the same desirable filtering and sorbing effectivenesses but those based on non-porous substrates, such as sand, glass beads and synthetic organic polymers, are less effective, possibly because they may have the metal hydroxide coating more readily removed from them during use.

In the various embodiments of the process described above, the metal hydroxide thickness on the substrate (or weight percentage of the metal hydroxide) is in the preferred range previously described and the products resulting, although containing a coating of flocculent or gelatinous material, are free-flowing and essentially non-gelatinous in properties, in that they do not objectionably adhere or cohere and form compacted masses. The electrolytic products made, when employed in packed beds, in filter elements or as coatings on supports through which materials will be filtered, are effective filtering means and additionally sorb various chemicals, e.g., organic dyes, from aqueous media being filtered or otherwise treated. They have similar effects with respect to chemical sorption when mixed with such media and subsequently separated from them. In one such useful application the aluminum hydroxide-coated pine sawdust particles previously described are employed effectively as a bed in an aquarium filter but more commonly they are utilized to remove inorganic and organic impurities from waste streams, such as coke oven, foundry and paper mill wastes, wherein the percentage of sorbable chemical is usually less than 0.1% but may be as high as 1% or even 5% in some instances. Of course, in such applications they may also filter out colloidal particles or macroparticles, the percentages of such in the liquid media treated usually being less than 1% and often less than 0.1%, but sometimes being as high as 5%, and often less than 0.1%, but sometimes being as high as 5%, too.

EXAMPLE 2

Utilizing a polymethyl methacrylate tube having an inside diameter of about 2.5 cm. and a total height of about 30 cm., with 100 cubic centimeters thereof filled with aluminum hydroxide-coated pine sawdust of the type described in Example 1, made by the electrolytic method therein described (and maintained wet until use), the apparatus of FIG. 3 is employed to treat a dispersion of India ink in water. The initial transmittance of the feed dispersion is measured at 2.5%, employing light at a wavelength of 475 microns. The aqueous India ink dispersion is flowed through the bed of metal hydroxide-coated sawdust at the rate of 50 ml./min. and after a total flow of 6.5 liters the transmittance of the composite effluent is 98%. The concentration of black pigments at the lower part (the entrance portion) of the bed is initially apparent and as the flow continues such blackening of the bed progresses upwardly.

Similar results are obtained when, instead of employing a filter bed, a cartridge or a coated filter paper is utilized, in the case of the filter paper the India ink-filter paper relationship being such that normally much of the ink pigment passes through the paper when the liquid is gravity fed (the method employed in such variation of this experiment) through the paper only (uncoated). In such cases also almost all the pigment is removed from the solutions charged.

In a variation of this experiment magnesium hydroxide-treated-pine sawdust, -chopped linen, -fir sawdust and a mixture of all three are utilized and essentially all the black pigment is removed from the solution charged. In a further modification the experiments are repeated with mixed magnesium hydroxide-coated and aluminum hydroxide-coated pine sawdust activated sorbent particles of the type described in Example 1 and essentially the same results are obtainable.

EXAMPLE 3

Coke oven effluent waste, having a yellow-brown color, a transmittance of 65.4% at 475 microns, a chemical oxygen demand of 380 p.p.m. and containing 40 p.p.m. phenol, is passed through the bed of aluminum hydroxide-activated pine sawdust particles of Example 2 at the ate of 50 ml./min. After passage of 6.5 liters through the bed the composite resulting is of a transmittance of about 92%, the chemical oxygen demand is substantially reduced (to 230 p.p.m.) and the phenol content is reduced to 35 p.p.m.

When the described experiment is repeated, utilizing a pine sawdust coated with the amount of magnesium hydroxide electrically equivalent to the aluminum hydroxide deposited (1.5 times the molar proportion), the percent transmittance after the passage of about 6.5 liters of solution is over 96% and what is more, after 32 liters have been passed through the bed the average transmittance is about 95%, showing that the more positively charged magnesium hydroxide-coated particles are superior in activity against coke oven effluent impurities, compared to the more amphoteric aluminum hydroxide-coated particles. When this experiment is repeated, utilizing sand and ground phenol formaldehyde polymer particles of essentially the same particle size as substrates, good color removal is also obtained.

The experiments of this example are repeated, using virgin granular activated charcoal as the bed material for comparison and transmittances resulting are less than those with the invented activated sorbents, as previously described.

EXAMPLE 4

An upstate New York well water containing 4 p.p.m. of sulfide and 25 p.p.m. of iron and having a transmittance of 81%, a resistivity of 689 ohms/cu. cm. and a pH of 8.3 is flowed through the aluminum hydroxide-coated pine sawdust bed described in Example 2 at the same rate therein mentioned. After flowing 27 liters through the bed the iron and sulfide have been almost totally removed from the water, less than 1 p.p.m. of each remaining, and the transmittance is over 99%. The pH is lowered to 8.1 and the resistivity and hardness remain unchanged, showing, little or no ionizable salt has been removed. The bed shows no sign of exhaustion and it effectively has removed color bodies and suspended finely divided colloidal and macro particles.

EXAMPLE 5

In this example the activity of chemically produced aluminum hydroxide on pine sawdust is compared to that of the electrolytic product in treating coke oven effluent (see Examples 2 and 3). In the electrolytic coating method 0.51 gram of aluminum, corresponding to 12.6 g. of aluminum sulfate octadecahydrate, is employed to produce hydroxide to coat 400 g. of sawdust.

Thus, to utilize the equivalent proportion of aluminum sulfate, 50 g. of sawdust are stirred for 1 hour in 600 ml. of water with 1.6 g. of the hydrated aluminum sulfate and the stoichiometric proportion of available hydroxide to produce the desired aluminum hydroxide coating on the sawdust. Various ways of making the chemical product may be utilized but the preferred method employed is that in which the additions of materials to the turbulently circulating sawdust is gradual and regular over the entire reaction period.

When the coke oven effluent is fed to the bed at the rate of 50 ml./min. its initial transmittance of 57% is raised to an average of only about 65% after the passage of 6.5 liters, noticeably inferior to the result reported in Example 2. However, the chemically coated sawdust is more efficient than plain sawdust for color body removal and for filtration of colloidal and macro particles, as, of course, is the electrolytic particulate sorbent of this invention.

EXAMPLE 6

Employing the apparatus of FIG. 4, with a bed of 3.3 liters filled with the aluminum hydroxide-coated pine sawdust of Example 2, a coke oven effluent liquid having a transmittance of 36% at 475 microns is fed at the rate of 500 ml./min. through the bed over a period of twenty hours. The percent transmittance, initially 85, drops to 60 after twenty hours but the average transmittance for the run is over 70%. The bed is still a useful filter after that period of time and is not blocked by filtered material. On the contrary, when, instead of employing the present particles, aluminum hydroxide alone is utilized, the rate of possible throughput of liquid is so significantly diminished as to make the process inoperative. Similar results are obtained using iron hydroxide-coated pine sawdust made electrolytically, using a stainless steel anode.

In a variation of this experiment the throughput from the cell is put through a similar cell to further diminish the color content thereof. Thus, the initial 85% transmittance may be increased to over 90% and the 60% transmittance at the end of twenty hours may be increased to over 70%.

EXAMPLE 7

The aluminum hydroxide-activated pine sawdust of Example 2, the manufacture of which was described in Example 1, is utilized to remove dyes and colorants from a paper mill white water. The white water contained an organic dye having the buff color and in addition, methylene blue was added to such water in another variation of the test. The test waters were gravity fed through different column lengths of the previously rinsed activated sawdust (rinsed to remove color from the accompanying water), with the following results.

| Feed Water | Color (APHA) Before | Color (APHA) After | Length of Column (cm.) |
|---|---|---|---|
| Raw Waste | 300 | 55 | 33 |
| Raw Waste | 300 | 40 | 52 |
| Raw Waste Plus 1 g. Methylene Blue/100 ml. | 82,500 | 70 | 48 |

Preferably, rinsed activated sorbent particles are used for this and the other experiments and examples of this invention and application.

EXAMPLE 8

The aluminum hydroxide-coated sawdust of Examples 1 and 2 is coated onto the upper surface of a 10n filter paper in a filter funnel and various effluents, in separate experiments, are passed through such coated filter papers. For comparison, plain sawdust is employed. Also, in a variation, as a coating on the filter paper, electrolytic coated sawdust is used, maintained wet since manufacture and in a different experiment it is air dried before use to dehydrate the metal hydroxide. Finally, sawdust coated with sodium aluminate, maintained wet before use, is also used. (In all the previous examples, 2-7, the activated particles had been maintained wet from manufacture to use).

For India ink removal, electrolytically coated product that had been maintained wet was superior to that which had been electrolytically coated but had been intermediately dried and such products were superior to the sodium aluminate-coated sawdust and to ordinary sawdust. Similar relationships applied for color changes in coke oven effluent and instant coffee and for the removal of colloidal and macro particles from charged liquids. Surprisingly enough, while neither plain sawdust nor charcoal nor electrically coated and maintained wet activated particles of this invention reduced water hardness of a city water, such hardness was reduced about 20% by use of the electrically coated and intermediately dried product and the pH of an ammonium hydroxide solution was also further reduced, from 8.2 to 6.8 by the dried product, compared to from 8.2 to 7.2 for the maintained wet electrolytic product.

In modifications of the purification processes of Examples 2-8, utilizing the other invented sorbent particulate materials of Example 1, in cartridge, packed bed and coating form, similar improvements in particulate and organic chemical, e.g., dye, removal are obtained.

The invention has been described with respect to various illustrations and embodiments thereof but is not to be limited to these because it is evident that one of skill in the art with this disclosure before him will be able to utilize substitutes and equivalents without going outside the scope of the invention.

What is claimed is:

1. A process for the manufacture of a sorbent particulate material, substantially all of which is of a mean particle diameter of about 0.1 to 10 mm., which comprises passing an electric current between an anode of a metal capable of forming a flocculent hydroxide, which is selected from those of Groups IIA, VIB, VIIB, VIII, IB, IIB, IIIA, IVA and VA and alloys thereof, and a cathode in a turbulent electrolyte containing dispersed particulate material of the given size, to form a metal hydroxide and deposit it on the dispersed particulate material.

2. A process according to claim 1 wherein the aqueous electrolyte contains from 25 to 300,000 parts per million by weight of dissolved conductive salt, the current is direct, the voltage impressed between electrodes is from about 3 to 90 volts and the dispersed particulate material is maintained in circulation in the electrolyte at an electrolyte Reynolds number greater than the critical Reynolds number so that the particulate material repeatedly contacts the anode.

3. A process according to claim 2 wherein the particulate material is sawdust.

4. A process according to claim 3 wherein the current density at the anode is in the range of 0.1 microampere per square centimeter to 5 amperes/sq. cm. and the time of the process is such as to transfer from 1 to 100 coulombs per gram of particulate materials to the anode to solubilize it so that it forms the corresponding metal hydroxide, which is about equivalent to 0.005 to 1% of the metal hydroxide in the final sorbent particulate material produced, on a dry basis.

5. A process according to claim 4 wherein the particulate material with metal hydroxide thereon is dried to remove from it water in excess of that of hydration of the metal hydroxide, to produce free flowing, non-agglomerating and non-gelatinous particles of sorbent material.

6. A process according to claim 4 wherein the anode is of aluminum.

7. A process according to claim 4 wherein the anode is of an iron alloy.

8. A process according to claim 4 wherein the anode is of magnesium.

9. A sorbent particulate material which is the product of the process of claim 1.

10. A sorbent particulate material according to claim 9 which is the product of the process of claim 6.

11. A sorbent particulate material according to claim 9 which is the product of the process of claim 8.

12. A sorbent particulate material according to claim 9 which is the product of the process of claim 7.

* * * * *